Figure 1:
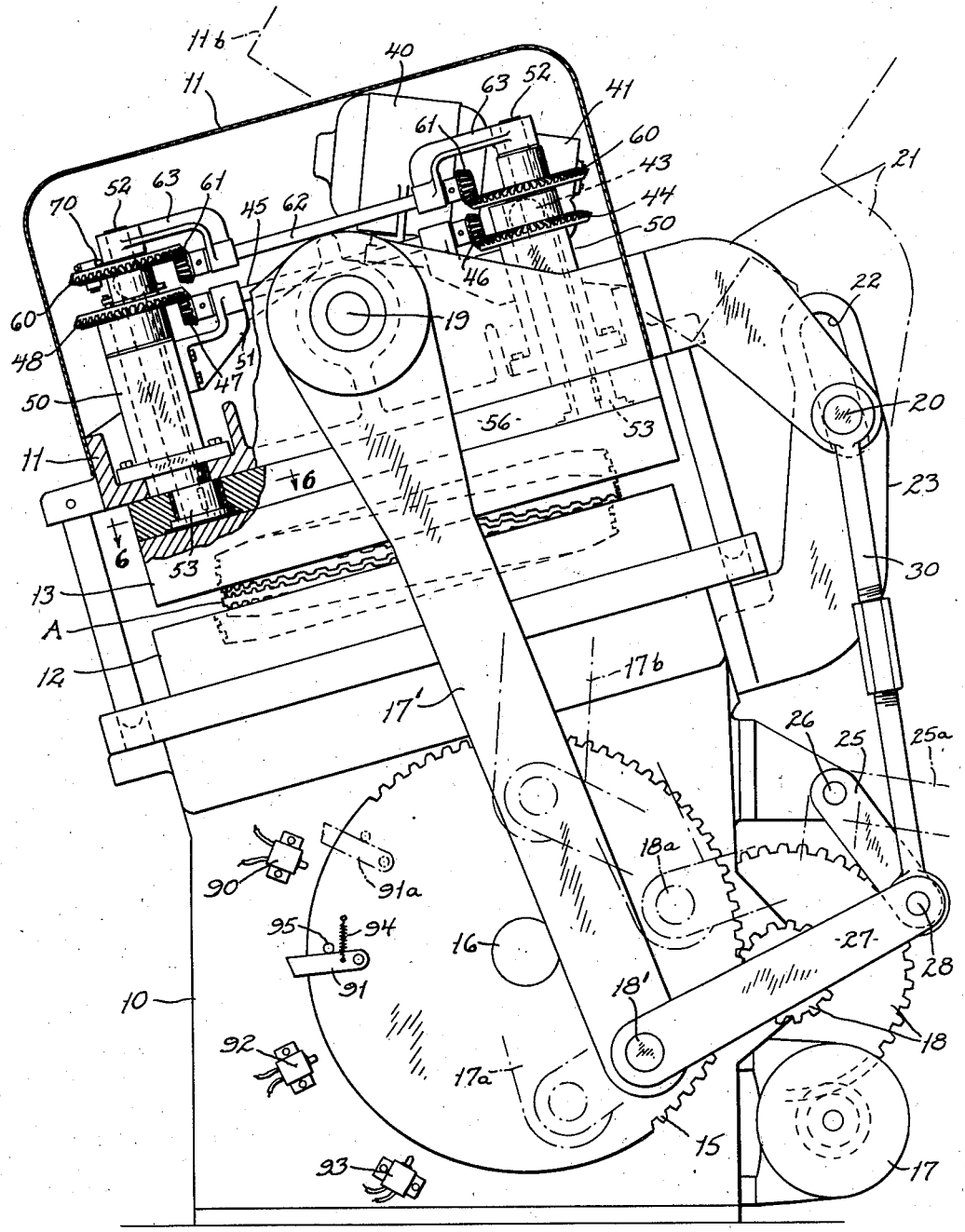

Dec. 26, 1944.  E. C. KASTNER  2,365,764
METHOD AND APPARATUS FOR STRIPPING ARTICLES FROM MOLDS
Filed March 6, 1942  5 Sheets-Sheet 1

INVENTOR.
Edward C. Kastner
BY Dales, Tears & McBean,
Attorneys.

Dec. 26, 1944.　　　　　E. C. KASTNER　　　　　2,365,764
METHOD AND APPARATUS FOR STRIPPING ARTICLES FROM MOLDS
Filed March 6, 1942　　　5 Sheets-Sheet 2

INVENTOR.
Edward C. Kastner
BY Bates, Teare & McKean
Attorneys

Dec. 26, 1944. E. C. KASTNER 2,365,764
METHOD AND APPARATUS FOR STRIPPING ARTICLES FROM MOLDS
Filed March 6, 1942 5 Sheets-Sheet 3

INVENTOR.
Edward C. Kastner,
By Bates, Teare & McDean,
Attorneys.

Dec. 26, 1944.　　　E. C. KASTNER　　　2,365,764
METHOD AND APPARATUS FOR STRIPPING ARTICLES FROM MOLDS
Filed March 6, 1942　　　5 Sheets-Sheet 5

INVENTOR.
Edward C. Kastner,
BY Bates, Teare & McDean,
Attorneys.

Patented Dec. 26, 1944

2,365,764

UNITED STATES PATENT OFFICE 2,365,764

METHOD AND APPARATUS FOR STRIPPING ARTICLES FROM MOLDS

Edward C. Kastner, Fairlawn, Ohio, assignor to The Akron Standard Mold Company, Akron, Ohio, a corporation of Ohio Application March 6, 1942, Serial No. 433,555

37 Claims. (Cl. 18—17)

This invention is concerned with the stripping of articles from separable molds and has been developed especially with reference to rubber articles to be stripped from vulcanizing molds. The primary object of the invention is to provide a method and apparatus for so stripping the article that it shall be effectively released from the mold without danger of injuring the article. This danger is particularly noticeable with the stripping of non-skid tires or other articles having projections on the surface, the projections tending to cling within the individual recesses leading from the main cavities in both mold members and receiving a shearing stress as the mold members separate.

In the stripping of non-skid tires from vulcanizing molds, it has been proposed to shift one mold in a straight path obliquely with reference to the other in their separation. While this may help as to certain regions of the tire, nevertheless such oblique movement applies an undesirable stress to portions of the tire in regions which are approximately parallel to the direction of the oblique movement, and this may cause an injury to the tire in such regions.

I avoid the unequal action on the article being stripped by giving one mold a circular translation with reference to the other during the separating action, but while the article is in contact with both mold members. By "circular translation" I mean such movement of a member bodily that an infinite number of points thereof trace circles about an infinite number of centers, in contradistinction to a "rotation" where every point (except those coincident with the axis) travels about the same center. This causes the shifting to take place against all portions of the article, so that the article in effect rolls out of its mold cavities and is gradually and easily stripped from the mold members, enabling a complete separation of such members without injury to the article.

In my invention, I not only give the circular translation to one mold member, so that all points thereof move in identical orbits, but I provide an initial shifting of the mold in an arcuate path, so that the orbit of any point surrounds the original position of that point, and thus the stripping is effective as to the entire periphery of the article, which rotates in the direction opposite the orbital movement.

My invention includes such a method of stripping articles from their molds by causing one mold member to have an orbital movement with reference to the other mold member, and also the step of initially shifting one of the mold members to select the locus of the orbital movement, so that it may act against the entire periphery of the article to be stripped. My invention includes also suitable apparatus for carrying out this method and especially the apparatus of the general character illustrated in the drawings hereof and hereinafter described.

In such drawings, I have shown two embodiments of the apparatus, the first embodiment being shown with reference to molds for rubber tires and the second with reference to molds for a set of balls. It is to be understood that the apparatus of the first form may have its molds formed with a set of cavities for balls or other individual articles and the apparatus for the second form may have an annular cavity for a tire, if desired.

Figure 6:
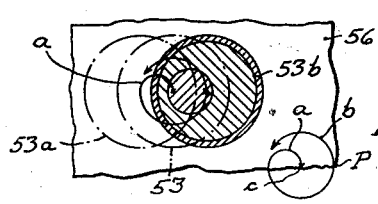
Figure 2:
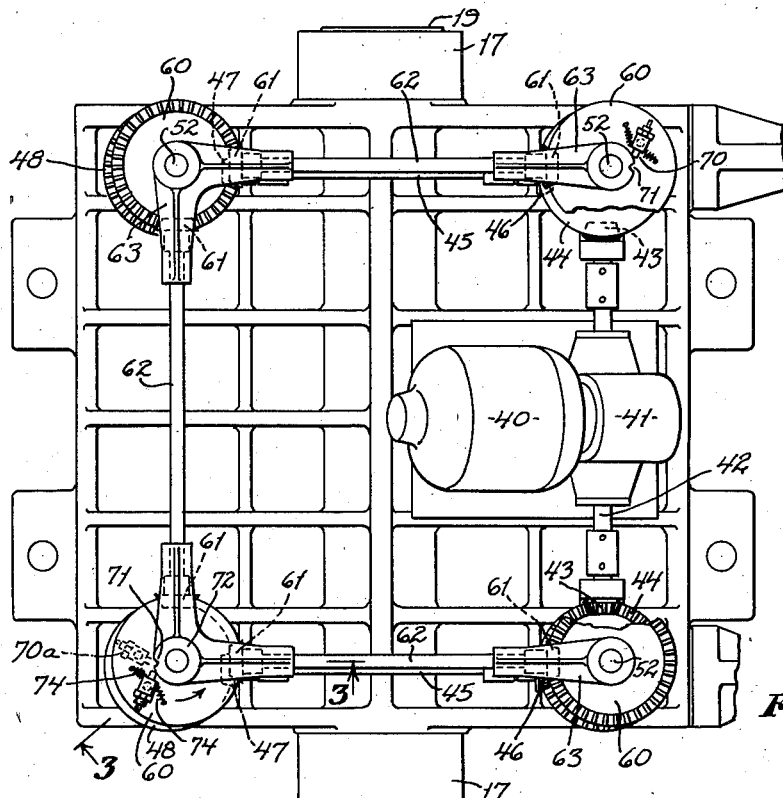
Figure 3:
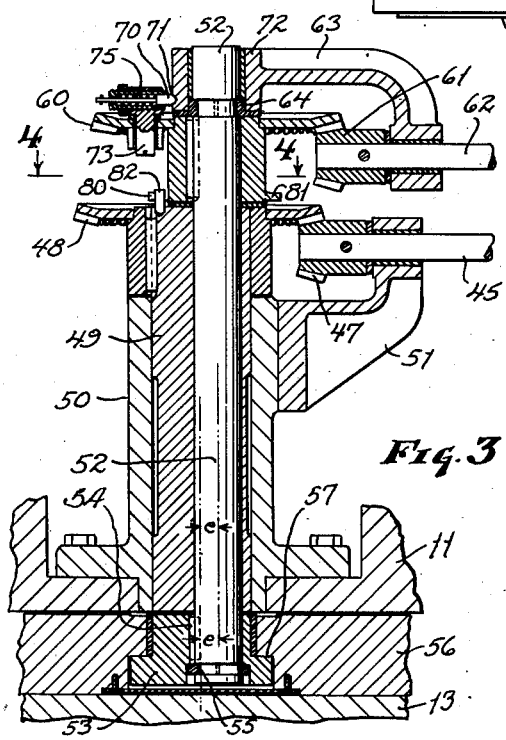
Figure 4:
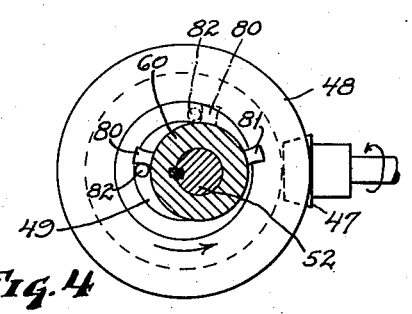
Figure 5:
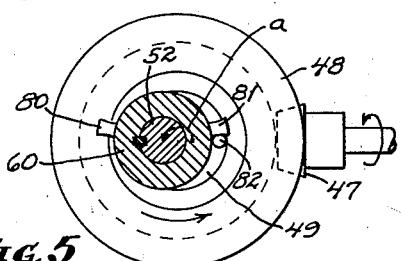
Figure 7:
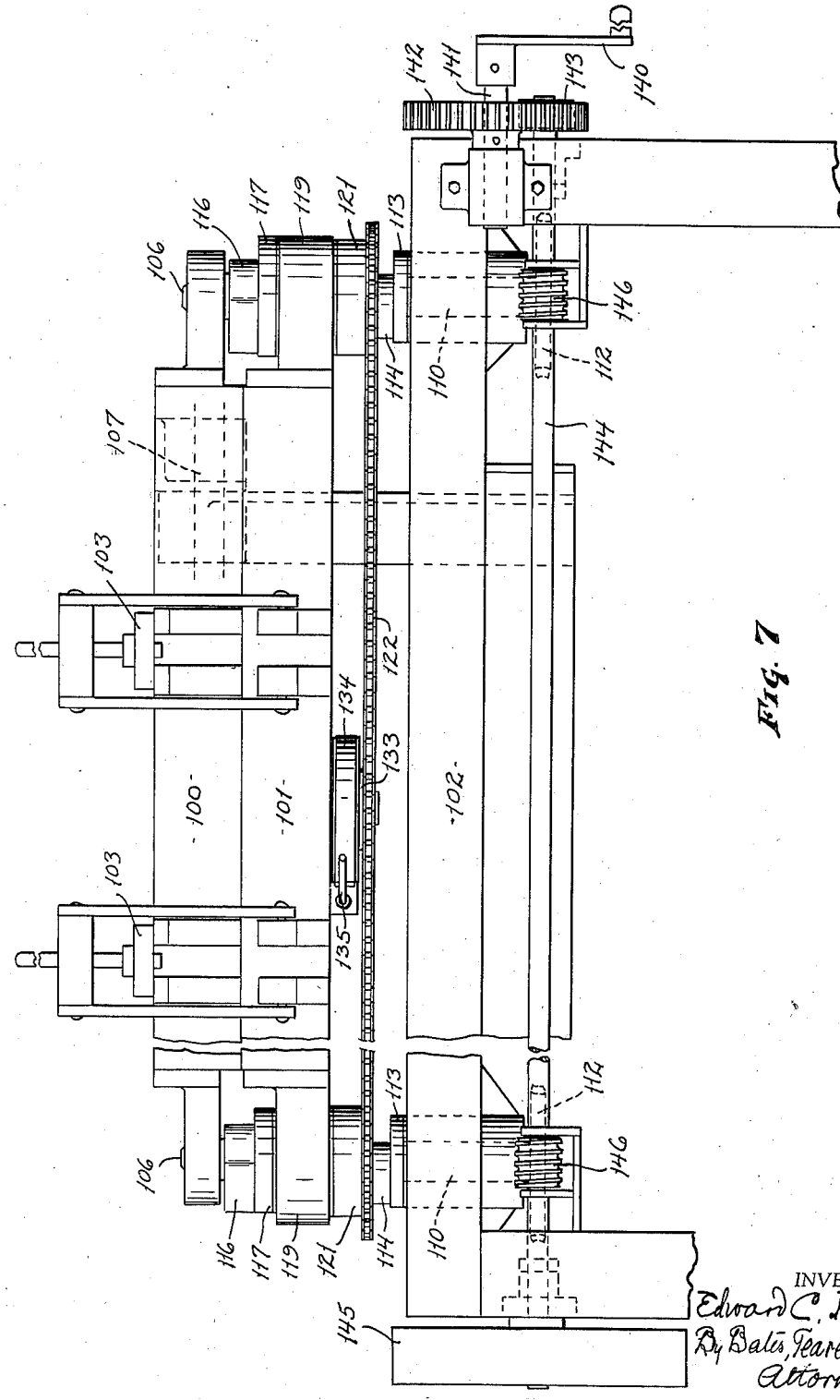
Figure 8:
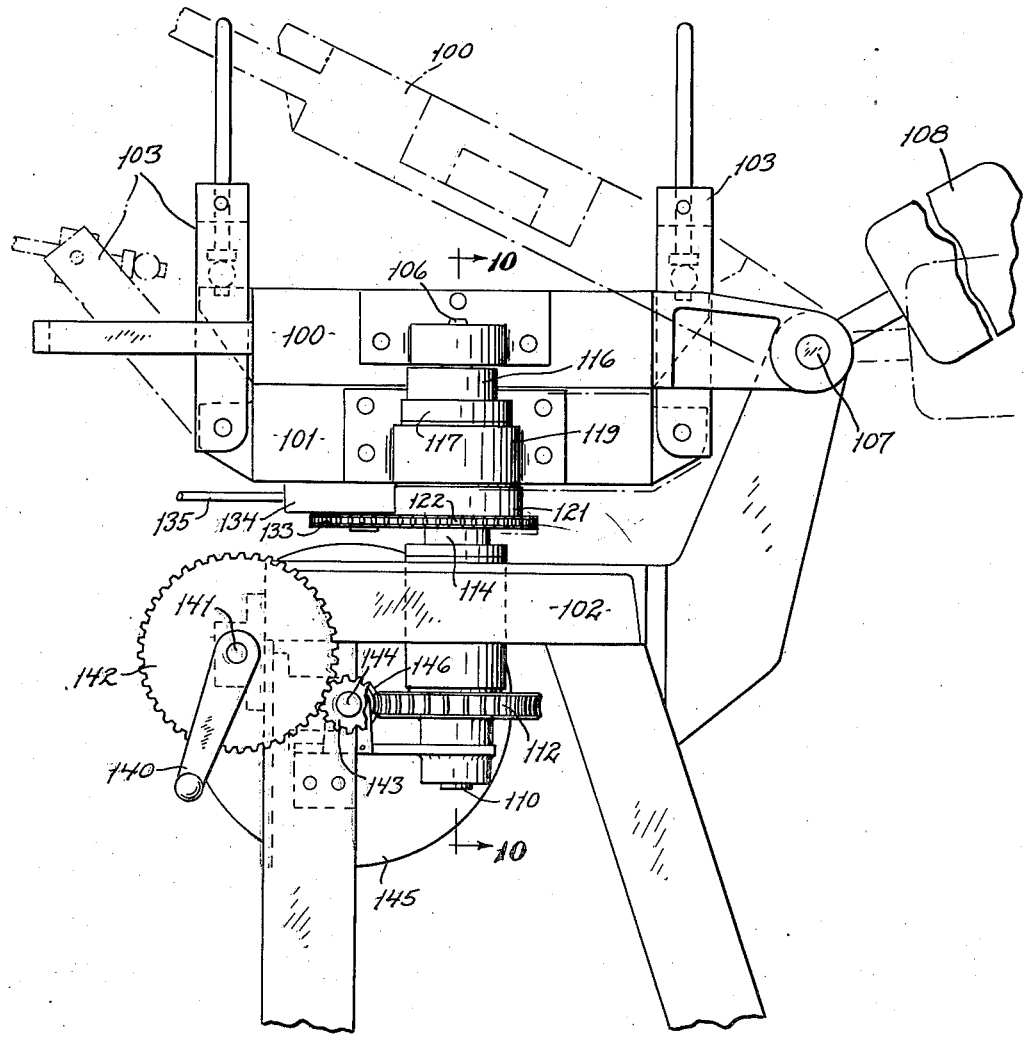
Figure 9:
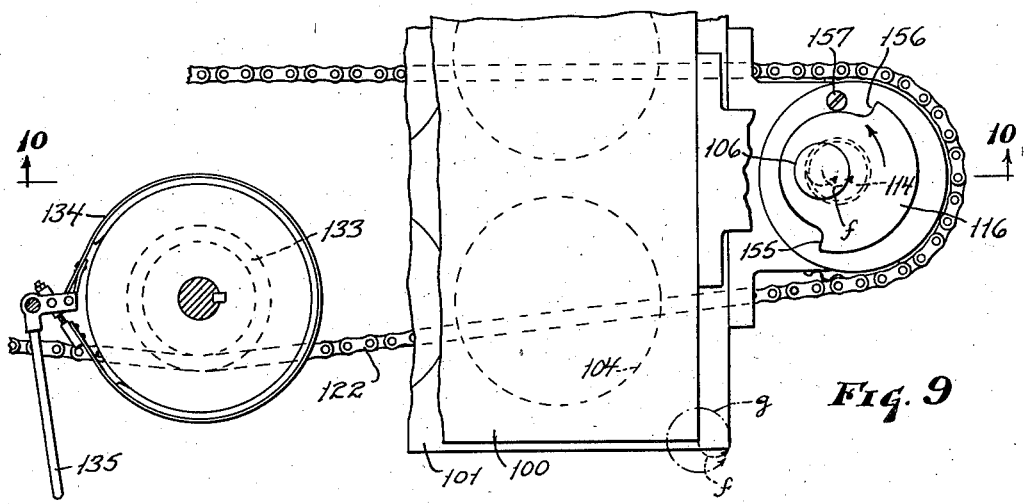
Figure 10:
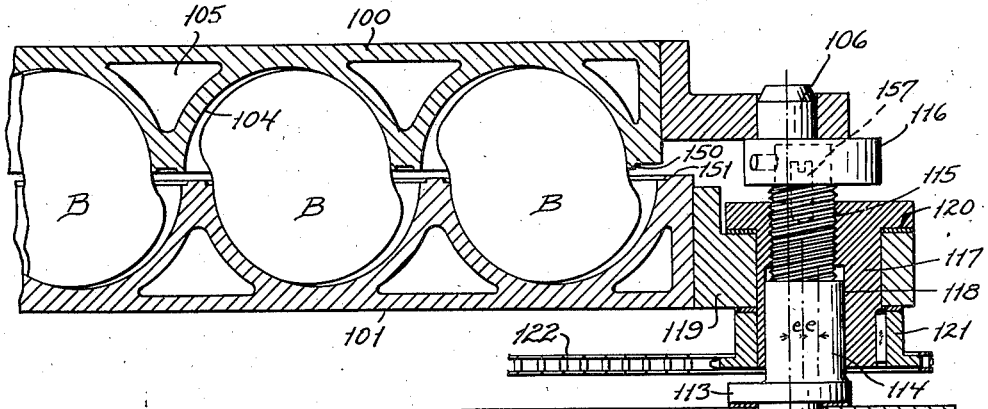
Figure 11:
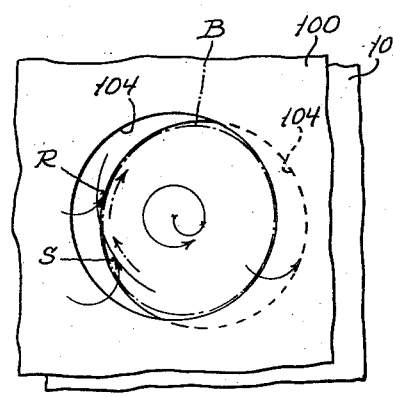

In the drawings, Fig. 1 is a side elevational view of a tire vulcanizing press embodying the stripping mechanism of my invention, parts being broken away to illustrate the construction more clearly; Fig. 2 is a top plan view of the tire press; Fig. 3 is a vertical section taken on the line 3—3 of Fig. 2; Fig. 4 is a horizontal section taken on the line 4—4 of Fig. 3; Fig. 5 is a view similar to Fig. 4, but showing the parts in a different position; Fig. 6 is a section taken on the line 6—6 of Fig. 1, and an associated diagram of the mold's stripping movement; Fig. 7 illustrates an alternative form of press, embodying a modification of the stripping device of my invention; Fig. 8 is an end elevation of the press of Fig. 7; Fig. 9 is a partial top plan view of this embodiment; Fig. 10 is a vertical section taken on a line 10—10 of Fig. 8 but showing the molds relatively offset, as during the stripping action; and Fig. 11 is in the nature of a diagram to illustrate relative motion of some of the parts.

In the embodiment illustrated in Figs. 1 to 6 inclusive, a base 10 and movable head 11 are provided which carry the usual lower and upper molds, 12 and 13 respectively, for the curing of a tire A therein, the molds having steam jackets (not shown) if desired.

Although the present invention is independent of the particular means for opening and closing the press, it is desirable that the upper mold remain substantially parallel to its original position during the first portion of its opening movement. I have illustrated in Fig. 1, therefore, a mechanism which is designed to effect this result and which will now be described.

It will be understood that the mechanism shown in Fig. 1 is repeated at the opposite side of the press. A bull gear 15 carried by a cross shaft 16 is driven from a motor 17, through intermediate gearing 18, and operates as a crank to raise and lower the head 11 by means of a link 17'. The link is pivoted to the gear 15 at 18' and the head 11 at 19. At the lower extreme position of the link 17', illustrated by the broken lines 17a, the molds are completely closed, and at the upper extreme position 17b, the upper mold has been completely opened, as indicated by broken lines at 11b.

The angular position of the head 11 is controlled by a cross shaft 20 secured by brackets 21 to the head. The shaft slides in a vertical slot 22 in a bracket 23 carried by the frame 10, and is positioned by means of a linkage driven from the bull gear 15. A crank arm 25 is pivoted at 26 at the rear of the frame and is adapted to be reciprocated by means of a link 27 between its free end 28 and the pivot 18' of the link 17 on the bull gear. A push rod 30 extends between the free end 28 of the crank arm and the cross shaft 20 before mentioned.

The arrangement described is such that when the link 17 is in its lowermost position the crank arm 25 will be lowered to a point corresponding to the lowermost position of the cross shaft 20. At this time the upper mold is parallel to and clamped against the lower mold. As the bull gear is rotated by the motor 17 in opening the press, the link 27 will cause the crank arm 25 to swing upwardly and thereby to raise the cross shaft 20. As the link 17 is at the same time raising the pivot 19 of the head, the upper mold is maintained very nearly parallel to its closed position. This action continues until pivot 18' reaches its on-center position 18a and, from that time on, the link 27 returns the crank arm 25 to lower the cross shaft 20.

As the pivot 19 of the head is being raised and the cross shaft 20 is being lowered, the head is tilted more and more until it reaches its final position 11b. To close the press the motor 17 is reversed and the parts returned through the same cycle in the opposite direction to their former positions.

In the embodiment being described, my invention particularly relates to a means for imparting motion to the upper mold during the raising movement just described, whereby such mold is shifted in its own plane. The shifting movement is such that the mold remains laterally parallel at all times to its original position, but each point thereof describes a path which may be termed at first arcuate and then circular, the combination being approximately spiral. During the arcuate portion of the movement, the upper mold is moved laterally from its normal position of registration with the lower mold a definite distance, and then during the subsequent movement each point of such mold describes a circle about the original position of that point as a center.

A tire which is within the mold, and which is to be stripped therefrom by the movement just outlined, is first cramped between the upper mold at one end of a diameter and the lower mold at the other end of that diameter, and is thereby forced from the lower mold at the first end and from the upper mold at the other end of that contracted diameter as may be seen by the dotted lines in Fig. 1. Then, in effect, the diameter of cramping is caused to rotate, so that all parts of the tire are in turn stripped from their respective molds.

The action described may take place as soon as the register of the two molds has sufficiently cleared, immediately after the initiation of the raising movement by the press operating mechanism, and may continue as the upper mold continues to move upwardly, or the molds may be given an initial separation and then stopped while the shifting action takes place to release the tire from the mold, whereupon the raising action is resumed to swing the upper mold out of the way, enabling the operator to lift the tire from the press.

It will be understood that the tire illustrated has the usual non-skid tread which must be forced out of engagement with the protuberances and ribs in the molds, but that once having been forced therefrom the tire will lie freely on top of the lower mold.

The mechanism which causes the peculiar shift of the upper mold will now be described. Mounted on the head 11 is a motor 40 which, through a worm gear unit 41, drives a cross shaft 42 carrying pinions 43 at its ends. Each pinion meshes with a bevel gear 44 which, in turn, through a forwardly extending shaft 45 and bevel pinions 46 and 47, drives a similar bevel gear 48. The arrangement is such that all four bevel gears are rotated in the same direction and drive similar mold shifting units at the four corners of the head. Only one such unit will be described.

As best seen in Fig. 3, the bevel gear 48 is keyed to a sleeve 49 which is rotatable in a standard 50 bolted to the head. Such standard may carry the bearing bracket 51 for the shaft 45 and bevel pinion 47. Rotatable within the sleeve 49 is an eccentrically carried shaft 52 projecting above and below the sleeve. At its lower end the shaft 52 carries an eccentric foot 53, keyed thereto as at 54 and supported thereby by means of a groove in the shaft and a split ring 55 therein. The foot 53 is circular and rotatable in a bearing in a plate 56 to which the upper mold 13 is secured. The plate and mold are supported by means of an annular shoulder 57 on the foot and hence hang from the four eccentric shafts 52.

Due to the equal eccentricities e—e of the shaft 52 within the sleeve 49 and of the foot 53 upon the shaft 52, the foot 53 in its normal position, shown in Fig. 3, will be aligned with the sleeve. Thus, rotation of the sleeve by the bevel gear 48 will have no effect upon the position of the plate 56 as long as the shaft 52 merely revolves with the sleeve about the sleeve axis, and the parts thus rotate as a unit. In this normal position the upper mold is in registration with the lower mold. If, however, the shaft 52 be kept from rotating, by means later to be described, while the sleeve 49 is turned, the shaft will receive a circular translation and the foot 53 will be moved laterally and thus shift the plate 56 and mold 13.

It is important that the angular position of all four shafts 52, with respect to the head, be the same at all times, so that the mold 13 may be brought into accurate registration with the lower mold. I, therefore, interconnect these shafts by providing four bevel gears 60 which are keyed near the upper ends of the respective shafts 52 and interconnected by bevel pinions 61 and shafts 62. This causes the rotation of all four bevel gears 60 to be in the same direction and of the same amount. The shafts 62 are mounted in the bearing brackets 63 carried at the upper ends of the respective shafts 52, and thus the entire interconnecting system may be moved laterally as a unit.

The shaft 52 is supported in a vertical direction by means of a groove near its upper end and a split ring 64 therein which bears on the upper surface of the gear 60.

As previously mentioned the foot 53 is shifted laterally by rotating the sleeve 49 while maintaining the eccentric shaft 52 non-rotational. To prevent rotation of the shaft 52 due to friction between it and the sleeve 49, I provide a stop in the form of a spring-pressed plunger 70 which is carried by the bevel gear 60 and adapted to engage a notch 71 in the hub 72 of the bearing bracket 63. The plunger 70 has a pivotal connection at 73 on the gear and is constantly urged in an inwardly radial direction by two lateral springs 74 as shown in Fig. 2.

At the start of the operation, the plunger 70 is facing in the direction illustrated by dotted lines at 70a in Fig. 2. As the motor 40 rotates the sleeve 49, the friction between the sleeve and shaft 52 will cause the latter to revolve about the sleeve axis and the plunger to slide around the bracket hub 72 until it reaches the notch 71. The spring 75 which backs up the plunger is sufficiently strong to overcome the effect of the frictional drive and, therefore, arrests the further rotation of the shaft 52. Further rotation of the sleeve 49 then shifts the shaft and the foot 53 bodily to shift the mold.

It will be noted that if the operation just described were allowed to continue, that is, if the shaft 52 were held stationary while the sleeve 49 rotated, the foot would be shifted laterally the maximum amount, 2e, and thence brought back to original position, this cycle being repeated as long as the sleeve 49 continued to rotate. Means, however, are provided which maintain the foot at its maximum extension when that position has been attained, and upon further rotation of the sleeve 49 the foot, therefore, acts as a crank to shift the mold in a circular path with a radius equal to the extension.

To cause the shaft 52 and bevel gear 60 to revolve with the sleeve 49, and thereby to maintain the extension of the foot, I provide lugs 80 and 81, on the hub of the bevel gear 60, which are adapted to be engaged by a pin 82 carried by the sleeves 49. At the end of a previous operation the pin 82 moved the lug 80 to some such position as that shown in Fig. 4 in dotted lines, and now at the start of the present operation, as previously mentioned, the sleeve 49 and shaft 52 are rotated as a unit due to the friction therebetween. They thus together reach the position 80, 82 shown in full lines in Fig. 4, at which time the plunger 70 reaches the notch 71 and further revolution of the gear 60 and shaft 52 is arrested. Upon continuing rotation of the sleeve 49, the pin 82 leaves the lug 80 and travels in the direction of the arrow through 180° until it reaches the lug 81, as shown in Fig. 5. During this half rotation of the sleeve the eccentric shaft 52 travels through a semi-circle, as indicated by the dotted arrow a in Fig. 5, and as indicated also in Fig. 6. Since the four eccentric feet 53 are keyed to the four shafts 52, each of them is shifted non-rotationally through a similar semi-circle, as is every point in the plate 56 and the upper mold 13.

After the pin 82 contacts the lug 81 the gear 60 and shaft 52 will be caused to rotate as a unit with the sleeve 49. In so doing, the spring 75 of the plunger 70 is overcome and the plunger is snapped over center to the position shown in full lines in Fig. 2 and thereafter rides along the surface of the hub 72, and, whenever in the course of its travel, it again reaches the notch 71, it is simply dragged past it without effect.

As the eccentric foot is now at its full extension and rotating as a unit with the sleeve 49, continued rotation of the latter will cause the foot to describe a circle with a radius 2e, equal to the diameter of the original semi-circle, and every point in the plate 56 and the upper mold 13 will be caused to travel non-rotationally along a similar circle about its original position as a center.

The motion described is illustrated particularly in Fig. 6 wherein the original position of the foot 53 is shown in broken lines at 53, and the position at which it reaches its maximum extension after having traveled through the small semi-circle is shown in broken lines at 53a. A subsequent position of the foot after it has traveled about the large circle is shown in full lines at 53b.

It will be seen that every point of the shiftable mold, such as that indicated at P in Fig. 6, is caused to leave its original position at c to travel through the small semi-circle a and then about the large circle b about its original position as a center. As previously mentioned, this action causes the diameter of cramping of the tire to rotate, and thus all parts of the tire are effectively stripped from the mold. In effect the tire is rolled out of both the lower and upper molds and is thus gradually freed therefrom until it may be lifted off by the operator.

After the stripping of the tire, the eccentric feet 53 are again returned to their normal position illustrated in Fig. 3, so that the two molds will be in register when again brought together. To effect this the motor 40 is reversed and the sleeve 49 is thus caused to rotate in a reverse direction. The pin 82 now no longer provides a drive for the gear 60 and the shaft 52 but, due to the friction between the sleeve 49 and the shaft, they rotate as a unit. The plunger 70 at this time is still in the angular position illustrated in full lines in Fig. 2 and is sliding along the hub 72 in a forwardly facing direction. When the foot 53 reaches the dotted line position 53a, Fig. 6, the plunger 70 engages the notch 71 in the hub and further rotation of the gear 60, and thus of the foot 53, is arrested.

During the succeeding 180° of rotation of the sleeve 49, the foot is caused to retrace the small semi-circle a and reaches its normal central position. At this time, the pin 82 contacts the lug 80 on the hub of the gear 60 and thereafter the sleeve 49 and the shaft 52 rotate as a unit. The plunger spring 75 is overcome and plunger 70 is snapped over center from the full line position to the dotted line position of Fig. 2 and thereafter travels around the hub at that angle.

As the foot 53 is now concentric with the sleeve 49, continued rotation thereof has no further effect on the position of plate 56 and the upper mold 13, and when the motor 40 is stopped the pin 82 and the lug 80 assume some such position as that illustrated in dotted lines in Fig. 4 and are thus ready for a succeeding cycle.

The operation of the stripping mechanism is preferably made automatic, so as to require no attention from the operator. This may be done very simply by having the motor 40 in circuit with the main press motor 17 so that as the press begins to open the stripping mechanism will be put in operation.

Alternatively, a starting switch 90 for the motor 40 may be provided as illustrated in Fig. 1 and adapted to be contacted by a dog 91, secured to the bull gear 15, a short time after it has left its original position 91a. As the bull gear continues to rotate, the press is gradually opened as previously described, and the stripping operation is effected by the motor 40 and the above described mechanism. Thereafter, the dog 91 may contact a switch 92, which operates to reverse the direction of the motor 40.

After sufficient time has elapsed for the parts to be returned to normal condition, and the upper mold returned to its registering position, the dog 91 may contact another switch 93 which operates to stop the motor 40 before the head 11 has reached its fully opened position.

The dog 91 may be urged by a spring 94 against a fixed stop 95 on the bull gear, so that during the subsequent closing of the press the dog may ride idly past the various switches and return to its former position 91a.

A modification of my invention is illustrated in Figs. 7 to 11 inclusive wherein the arcuate and circular motion is applied to a press shown as adapted for the curing of rubber balls. As there shown, upper and lower molds, 100 and 101 respectively, are supported on a base 102 and may be tightly clamped in registration by stirrup clamps 103. The molds are provided with a plurality of individual mold cavities 104 for the balls and may be steam jacketed as illustrated at 105. The upper mold 100, which rests upon a pin 106 when in closed position as will later be more fully described, is pivoted at 107 and provided with a counter-weight 108 and may be unclamped and swung to an upper opened position, as illustrated in broken lines in Fig. 8, for access to the balls.

In this embodiment it is the lower mold which is shifted to cause the stripping of the balls from the mold. The lower mold is supported solely by two eccentric spindles which are journalled in the base. The two spindles are similar and one only will be described.

As best seen in Fig. 10, a spindle 110 is journalled at 111 in the base 102 and provided at its lower end with a worm gear 112 which may be driven as later described. The spindle is supported by an annular shoulder 113 which bears upon the upper surface of the base and is provided thereabove with an eccentric or offset portion 114. The off-set portion 114 has a coarse-pitch thread 115 adjacent the upper end and extending for approximately half the length of the offset portion. Pinned to an upward extension of the offset portion 114, above the thread, is a collar 116 which carries the stud 106 previously mentioned. The stud 106 is concentric with the lower portion 110 of the spindle and therefore the upper mold 110 is fixed as regards any lateral shifting relative to the base.

To support the lower mold on the spindle a sleeve 117 having an eccentric bore 118 is journalled on the eccentric portion 114 of the spindle, the upper portion of the bore being threaded to engage the thread 115. The sleeve 117 is rotatable within a supporting bracket 119 attached to the lower mold 101, and is restrained from relative axial movement therein by an annular shoulder 120 at the upper end of the sleeve and by the hub of a sprocket 121 keyed at the lower end of the sleeve.

Rotation of the sleeve within the bracket may be prevented by restraint on the sprocket 121. A chain 122 passes around the sprocket and around a similar sprocket at the other end of the press and, intermediately, engages a sprocket 133 journalled on the lower mold. Secured to this sprocket 133 is a friction brake 134 operable by means of a handle 135 convenient to the operator. Thus rotation of the sprocket 121 and of the sleeve 117 relative to the lower mold can be arrested at anytime by application of the brake.

The press of the present embodiment is manually operated, and for this purpose, as shown in Figs. 7 and 8, is provided with a crank 140 pinned to a shaft 141 journalled on the base. Also keyed to this shaft is a gear 142 which meshes with a pinion 143. The pinion is pinned to a shaft 144 which extends the width of the press and is provided at its opposite end with a flywheel 145. Keyed to this shaft 144 are two worms 146 which mesh with the worm wheels 112, before mentioned as secured to the two spindles 110. Rotation of the two spindles in the same direction may thus be obtained by operating the crank.

Rotation of the spindles causes the lower mold member to be drawn downwardly from the upper mold member and to be given the same arcuate and circular lateral shifting motion described for the upper mold member in the first embodiment of this invention. The eccentricity of the sleeve 117 with respect to the bore 118 and that of the offset portion 114 with respect to the spindle 110 are equal, as indicated by the dimensions $e$—$e$, Fig. 10 (showing an abnormal position), and, therefore, in the normal position of the parts the sleeve is concentric with the spindle 110. At this time the upper and lower molds 100 and 101 are in registration, and the registers 150 and 151 ensure accurate alignment of the parts.

When at the end of the curing process the balls are to be freed from the molds, the brake 134 is applied to the chain 122, and hence the sleeves 117 are held against movement relative to the lower mold member. The crank 140 is now turned to rotate the spindles. As the spindle turns through the first 180°, the sleeve, and hence every point in the lower mold, is shifted laterally along a semi-circle with a radius equal to the eccentricity $e$, as indicated at small $f$ in Fig. 9.

At the start of the relative movement between the sleeve 117 and the spindle, a shoulder 155 on the collar 116 leaves engagement with a pin 157 carried by the sleeve. After a half revolution of the spindle, a second shoulder 156 on the collar 116 contacts the pin 157 and establishes a drive between the spindle and the sleeve 117.

The operator now releases the brake 134, and thereafter rotates the spindle and sleeve as a unit by the crank. As the sleeve has been shifted outwardly a distance equal to $2e$, the center thereof now describes a circle with $2e$ as a radius, and, hence, every point in the lower mold does likewise, as indicated at $g$ in Fig. 9. The parts are illustrated in Fig. 9 in the positions they assume immediately before the first half revolution of the spindle has been completed.

In addition to the lateral shifting of the lower mold, the rotation of the spindle also operates to separate the upper and lower mold a slight amount. Referring to the threaded engagement between the spindle and the sleeve at 115, it will be apparent that there is no axial movement between the parts as long as the spindle and sleeve rotate as a unit. However, at the start of the operation, as the spindle is making its first half revolution while the sleeve is held stationary, the sleeve travels downwardly along the spindle and thus draws the lower mold away from the upper. The registers 150 and 151 are thus disengaged and the molds are separated sufficiently so that the lower mold is free to receive its orbital movement.

It will be noted that each point on the lower mold is traveling arcuately at the same time it is being lowered and hence describes what might be termed a conical helix. The slant of the envelope of this helix is steeper than that of the mold registers and hence no binding takes place as the molds are opened.

As the molds are relatively shifted, the balls within the cavities are cramped between a portion of the upper mold and the portion of the lower mold diametrically opposite, thus forcing the balls away from the remaining portions of the mold. As the shifting progresses along the circular path the diameter of this cramping is rotated, in effect, so that all portions of the ball are eventually loosened from the mold.

A further effect of the circular shifting of the lower mold is to be noted. Referring to Fig. 11, the ball B indicated at broken lines, is illustrated as being cramped between the right hand portion of the upper mold 100 and the left hand portion of the lower mold 101. Now, since all points of the lower mold travel in mutually parallel paths, and since the center of the lower mold is at the right hand portion of its travel and is moving toward the top of the sheet, the point R on the lower mold, which is at the end of the minor axis of the compressed ball and hence is in firmest contact with the ball, is also moving toward the top of the sheet, as indicated by the arrow at this point. Hence the ball itself is urged in that direction in the region of contact. As the shifting continues, a neighboring point S becomes the point of firmest contact with the ball and, as it is then moving in the direction of the arrow at that point, the ball is urged in the same direction as before.

The additive effect of the circular movement of all the points on the circumference of the mold cavity thus causes the ball actually to rotate within the mold on its own axis and in a direction opposite to that of the circular shifting of each point of the lower mold. The action is analogous to that of a pair of meshing spur gears where, though one rotates clockwise and the other counter clockwise, the successive points of contact move in the same direction. Thus if there has been a pattern molded into the surface of the ball the projecting parts of the ball are caused to leave the respective recessed parts of the mold and are not permitted to become again enlodged therein, so that the freeing of the ball from both of the molds is insured.

When the balls have been stripped from the molds the crank 140 is turned in the reverse direction and the brake is applied to the chain 122. The spindle and sleeve 117 are thus relatively rotated, the shoulder 156 leaving the pin 157, to shift the sleeve along a semi-circle until it again reaches its concentric position relative to the spindle 110. At the same time it is caused to travel upwardly on the threads 115. After a half-revolution of the spindle the shoulder 155 engages the pin 157 and, upon release of the brake, the spindle and sleeve may rotate as a unit without further effect on the position of the lower mold. Due to this reverse operation the lower mold has been brought back to registering position and elevated so as to be ready for reengagement with the upper mold when the press is subsequently closed.

While the present form of the invention has been illustrated as embodied in a press for molding rubber balls, it will be apparent that it can be applied to molds for various other objects, including rubber tires. The stripping actions due to the rotation of the diameter of cramping and the rotational effect on the molded article illustrated in Fig. 11 are present in both the first and second embodiments herein illustrated, and result in the release of the molded article from the mold, irrespective of the particular form of the article. Such stripping action however, is especially advantageous with articles which are deeply indented or grooved, as is the case with non-skid automobile tires.

It will be observed that while the specific details of the two embodiments shown vary greatly from each other, they have in common a pair of coacting molds separable from each other and a pair of eccentric members, one carrying the other, and acting on one of the mold members to shift it laterally relative to the other member a short distance (compared to the width of the cavities of the molds) and thereafter causing every point of the shifted mold to travel in a circular path, the radius of which is the amount of lateral shifting. However, the disclosure of two quite different embodiments carrying out this operation should not be considered as an enumeration of all embodiments contemplated but, on the contrary, as a demonstration that my method may be performed by widely different mechanisms, I do not intend to limit myself to the details of either embodiment shown, though each of said embodiments are of my invention and are specifically claimed in some of the subordinate claims on the apparatus.

I claim:

1. The method of stripping articles from molds containing the same comprising the steps of engaging the article on diametrically opposite regions and progressively changing the regions of contact between the article and molds in a circumferential direction while the molds are separated a comparatively short distance.

2. The method of stripping articles from separable molds comprising separating the molds and during the period of separation cramping the article between a point on one mold and a diametrically opposite point on the other mold, and simultaneously advancing said points in the same relative direction.

3. The method of stripping articles from separable molds comprising separating the molds and giving every point of one of the molds circular translation relative to the other mold while both molds are in contact with the article.

4. The method of stripping articles from separable molds comprising giving one of the molds a preliminary shifting out of registration with the other and then giving one of the molds a circular translation with reference to the other while both molds maintain contact with the article.

5. The method of stripping an article from separable molds comprising separating the molds, and while they are separated a distance insufficient to discharge the article moving every point in one of the molds laterally to a new position, and then causing each of said re-positioned points to travel about its original position as a center.

6. The method of stripping articles from cooperative cavities in separable molds comprising separating the molds a comparatively short distance while maintaining them substantially parallel with each other, and while the molds are thus separated but while both are in contact with the article moving every point in one of the molds laterally in an arcuate path to a new position and then causing each of said re-positioned points to travel in an orbit about its original position.

7. In the method of stripping articles from separable molds, the steps of moving every point in one of the molds to a new position out of alignment with its original position and then causing every point of one of the molds to travel in a loop about a perpendicular to the meeting plane of the molds while both molds maintain contact with the article.

8. The method of stripping articles from separable molds comprising separating the molds by moving one of them away from the other while maintaining it substantially parallel to its original position and giving the movable mold a circular translation in its own plane while it is being separated from the other mold and while both molds maintain contact with the article.

9. The method of stripping an article from coacting cavitary molds containing the same comprising displacing one of the molds by a movement which causes every point thereof to travel through a semi-circle and then while both molds maintain their contact with the article causing every point of said displaced mold to travel about a circle the radius of which is the diametric chord of said semi-circle.

10. The method of stripping articles from separable molds comprising separating the molds by a continuous movement and during this movement and while both molds maintain contact with the article giving an orbital movement to various points about different perpendiculars to a plane substantially parallel to the face of the mold.

11. The method of stripping round elastic articles from cooperative cavitary molds containing the same comprising the steps of separating said molds and during the period of separation, while the article is in contact with both molds, giving one of the molds a circular translation in one direction, thereby causing the article to rotate in the opposite direction.

12. The method of stripping tires from a pair of coacting molds having annular cavities comprising separating the molds a less distance than the width of the tire and while the molds are thus separated giving one of the molds a movement such that different points of the mold travel around different perpendiculars to the face of the mold while the tire is in contact with both molds, and thereafter separating the molds farther to enable removal of the tire.

13. The method of stripping non-skid tires from a pair of coacting molds having annular cavities with individual recesses in the walls thereof comprising separating the molds slightly, then giving one of the molds a movement about a perpendicular to the face of the mold and while the tire is in contact with both molds.

14. The method of stripping non-skid tires from coacting cavitary molds comprising moving one of the molds laterally to carry it out of registration with the other mold and then giving it a circular translation to cause each point of that mold to move about the former registering position of such point as a center while the tire is in contact with both molds.

15. The method of removing non-skid automobile tires from two cooperative cavitary molds members, one above the other in a vulcanizing press, comprising separating the mold members, and while they are separated a materially less distance than the width of the tire and are maintained substantially parallel to their original positions giving one of the mold members a displacing movement laterally of the other mold member and then a circular translation in one direction, thereby causing the tire to rotate in the opposite direction and free itself from both mold members, and thereafter completely separating the molds, leaving the tire resting by gravity on the lower mold member.

16. An apparatus for stripping articles from cooperating molds comprising means for separating the molds insufficiently to entirely free the article and means for moving one of the separated molds in a path which causes several points of each mold to travel in circuits each different perpendicular to the face of the mold.

17. The combination of a pair of coacting cavitary molds, mechanism for separating the molds, and mechanism for giving one of the molds a circular translation while the molds are separated.

18. An apparatus for forming articles and stripping the same from the forming members comprising a pair of coacting cavitary molds, mechanism for moving one of the molds away from the other to increase the distance between their meeting faces, mechanism for shifting one of the mold members transversely of the other, and mechanism for thereafter giving one of the members a movement such that each point thereof travels in a path surrounding that perpendicular to the meeting plane which passes through the originally registering corresponding point on the other mold.

19. The combination of a pair of coacting cavitary molds, mechanism for separating the molds, and mechanism for shifting one of the molds in its own plane relative to the other mold and for giving the shifted mold a circular translation.

20. An apparatus comprising a pair of coacting molds having mating cavities to receive an article, mechanism for moving one of the molds away from the other, shifting mechanisms engaging one of the molds in a plurality of regions, and means for operating said shifting mechanisms simultaneously to shift that mold so that every point in each engaged region loops about a different perpendicular to the face of the mold.

21. The combination of a pair of coacting cavitary molds, mechanism for holding them in cooperation with the molds closed and for moving one away from the other, means for giving a circular translation to one of the molds when they are separated, a motor geared with said means, and means operating in timed relation with the opening and closing mechanism of the press for starting the motor, for reversing it, and for stopping it.

22. The combination of a pair of cavitary mold members, a plurality of eccentrics peripherally engaging one of the mold members and having their axes perpendicular to the mold face, means for simultaneously turning said eccentrics to give the latter mold member a circular translation.

23. The combination of a pair of mold members separable from each other and having cooperative mold cavities, mechanism for separating said mold members while maintaining them substantially parallel with each other, a plurality of eccentrics peripherally engaging one of the mold members and having their axes perpendicular to the mold face, and means for simultaneously operating said eccentrics during the period of separation to give that mold member a circular translation in plane parallel with its parting face.

24. In a stripping apparatus, the combination of a stationary frame, rotatable spindles carried thereby having eccentric portions, a pair of mold members, one of which is stationarily carried and the other of which is mounted on the eccentric portion of the spindles, the axes of the eccentric portions being substantially normal to the face of the mold member in which they are mounted, and means for rotating the spindles to give a circular translation to the latter mold member.

25. The combination of a pair of coacting cavitary mold members separable from each other, an eccentric peripherally engaging one of the mold members, another eccentric carrying the eccentric just mentioned, mechanism for operating one of said eccentrics to shift the last mentioned mold member bodily so that every point thereof travels in an arc, and mechanism for operating the other eccentric to move each of said points in a circular path, the center of which is the original position of such points.

26. Means for giving one mold of a pair an initial movement in its own plane relative to the other and for then giving it a circular translation in its own plane, comprising a sleeve, a shaft mounted eccentrically in a sleeve and having said portion outside the sleeve which is eccentric to the portion within it, and means for causing the sleeve and shaft to turn as a unit and for causing one of them to turn while the other is stationary.

27. A molding and stripping apparatus comprising a pair of coacting molds separable from each other and a pair of eccentric members, one carrying the other, and both acting on one of the mold members, means to turn one of said eccentric members relative to the other to shift one of the mold members laterally relative to the other member a short distance (compared to the width of the cavities of the molds) and means acting thereafter to turn the two eccentric members as a unit to cause every point of one of the molds to travel in a circular path, the radius of which is the amount of lateral shifting.

28. A vulcanizing press comprising a pair of coacting cavitary molds, a frame stationarily supporting one of the molds, a movable head for supporting the other mold, mechanism for moving the movable head toward or from the other mold, a set of shafts carried by the movable head with their axes substantially normal to the face of the mold carried by the head, an eccentric on the end of each shaft engaging the movable mold member and means for simultaneously turning the respective shafts.

29. In an apparatus for stripping formed articles from cavitary molds containing the same, the combination of a pair of mold members, means for separating them while maintaining them substantially parallel to each other, a plurality of parallel shafts, each shaft having an eccentric portion coacting with one of the molds, sleeves in which the shafts are eccentrically journalled, and mechanism for rotating the shaft and sleeve as a unit and for rotating one of them independently of the other to give an initial shift to the movable molding member and then to gyrate it bodily in circular paths.

30. In a vulcanizing press, the combination of a pair of molds, a stationary frame member carrying one of the molds and a movable frame member carrying the other mold, a plurality of sleeves rotatably mounted in said movable frame member, a corresponding plurality of shafts eccentrically journalled in the sleeves, eccentric heads on the ends of the shafts engaging and supporting the movable mold, mechanism for simultaneously turning the sleeves, a mechanism simultaneously acting on the shafts for preventing them from turning while allowing them to be shifted bodily by the turning of the sleeves.

31. In a vulcanizing press, the combination of a pair of molds, a stationary frame member carrying one of the molds and a movable frame member carrying the other mold, a plurality of sleeves rotatably mounted in said movable frame member, a corresponding plurality of shafts eccentrically journalled in the sleeves, eccentric heads on the ends of the shafts engaging and supporting the movable mold member, gears on the respective sleeves, driving mechanism meshing with said gears, gears on the respective shafts, connecting mechanism between the latter gears to insure their simultaneous action, and driving connections periodically engageable between the sleeves and the shafts.

32. A vulcanizing press comprising a frame, stationary mold member carried thereby, a movable head carried by the frame, opening and closing mechanism mounted on the frame and including a crank and a pitman connecting it to the head, a set of shafts carried by the head, eccentrics on the lower ends of said shafts, movable mold member carried by said eccentrics and coacting with the stationary mold member, mechanism for turning the shafts to shift the movable mold, a motor, and gearing between the motor and shafts, whereby the movable mold member may be caused to bodily shift in an orbital path during the separation of the mold members.

33. In a vulcanizing press, the combination of a frame, a movable head carried thereby, a pair of cavitary molds mounted in the frame and head respectively, mechanism mounted on the frame and head for holding them in cooperation to close the molds and for moving the head away from the frame to separate the molds, a set of sleeves rotatably mounted in the head, a set of shafts eccentrically mounted in the sleeves, heads on the lower ends of the shafts eccentric thereto and rotatably mounted in the upper mold member, a motor on the head geared with the sleeves for rotating them simultaneously, mechanism for causing the shafts to turn within the sleeves, mechanism operating in timed relation with the opening and closing mechanism of the press for starting the motor, for reversing it, and for stopping the motor.

34. In an apparatus for stripping elastic articles from cooperating cavitary molds, the combination of a pair of cooperating molds, a pair of sleeves rotatably mounted in one of the molds at the opposite ends thereof, a frame, a pair of spindles mounted in the frame having eccentric portions occupying the sleeves, a shaft geared with the spindles, means for rotating the shaft and means for preventing rotation of the sleeves, said last-mentioned means being releasable to allow the sleeves to rotate with the spindles.

35. In an apparatus for stripping elastic articles from cooperating cavitary molds, the combination of a pair of cooperating molds, a pair of sleeves rotatably mounted in one of the molds at the opposite ends thereof, a frame, a pair of spindles mounted in the frame having eccentric portions occupying the sleeves, a sprocket chain looped around sprockets on the respective sleeves, a brake for controlling the sprocket chain to prevent rotation of the sleeves, and means for rotating the spindles.

36. In a stripping apparatus, the combination of a frame, rotatable spindles carried thereby having eccentric portions, threads on the eccentric portions of the spindles and nuts with which the threads coact, a pair of mold members, one of which is movable said nuts being journalled in the movable mold member and means for holding said nuts against rotation, whereby the rotation of the spindles may effect the separation of the molds, and give a circular translation to one of the mold members.

37. In a stripping apparatus, the combination of a frame, upright spindles rotatably journalled therein and having eccentric portions, a pair of superposed mold members, the lower one of which is mounted on the eccentric portions of the spindles, means for rotating the spindles to give a circular translation to the lower mold member, sleeves journalled in the lower mold member and threaded on the eccentric portions of the spindles, means for preventing rotation of the sleeves, said spindles having extensions concentric with the journalled portion of the spindles which concentric extensions are journalled in the upper mold member, whereby the upper mold member remains stationary while the lower mold member descends and shifts in an orbital path.

EDWARD C. KASTNER.